(12) United States Patent
Akif et al.

(10) Patent No.: US 10,328,975 B2
(45) Date of Patent: Jun. 25, 2019

(54) FRONT END ASSEMBLY FOR A MOTOR VEHICLE

(71) Applicant: Bayerische Motoren Werke Aktiengesellschaft, Munich (DE)

(72) Inventors: Oeztzan Akif, Munich (DE); Wilhelm Riedl, Pfaffenhofen (DE); Gerhard Fichtinger, Grasbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 15 days.

(21) Appl. No.: 15/606,034

(22) Filed: May 26, 2017

(65) Prior Publication Data

US 2017/0259852 A1    Sep. 14, 2017

Related U.S. Application Data

(63) Continuation of application No. PCT/EP2015/076049, filed on Nov. 9, 2015.

(30) Foreign Application Priority Data

Nov. 28, 2014    (DE) ........................ 10 2014 224 438

(51) Int. Cl.
   *B60N 99/00* (2006.01)
   *B62D 21/15* (2006.01)
   (Continued)

(52) U.S. Cl.
   CPC ............ *B62D 21/152* (2013.01); *B60R 19/24* (2013.01); *B62D 25/085* (2013.01)

(58) Field of Classification Search
   CPC ...... B62D 21/152; B62D 25/085; B60R 19/24
   See application file for complete search history.

(56) References Cited

U.S. PATENT DOCUMENTS

| 2002/0175538 A1 | 11/2002 | Porner |
| 2012/0248819 A1 | 10/2012 | Okamura et al. |

(Continued)

FOREIGN PATENT DOCUMENTS

| CN | 1421347 A | 6/2003 |
| CN | 103946103 A | 7/2014 |

(Continued)

OTHER PUBLICATIONS

German-language Search Report issued in counterpart German Application No. 10 2014 224 438.2 dated Jul. 10, 2015 with partial English translation (12 pages).

(Continued)

*Primary Examiner* — Lori L Lyjak
(74) *Attorney, Agent, or Firm* — Crowell & Moring LLP

(57) ABSTRACT

A front end assembly for a motor vehicle has improved load absorption for forces acting on the front of the front end assembly. The front end assembly has at least one impact-absorbing crossbeam; at least one support beam which can be arranged vertically on the motor vehicle and towards the rear of the impact absorbing crossbeam, can be secured to a motor longitudinal support of the motor vehicle, and has at least one upper end portion that can be arranged at least partly above the motor longitudinal support. At least one support strut extends rearwards and downwards from the impact-absorbing crossbeam and via which the forces acting on the front of the impact-absorbing crossbeam can be partly transmitted to a front axle support of the motor vehicle. At least one deformation element can be arranged at least partly geodetically higher than the impact-absorbing crossbeam and in front of the upper end portion of the support beam at least partly on the front side, and is supported at least partly rearwards against the upper end portion of the support beam at least while deforming.

10 Claims, 4 Drawing Sheets

(51) Int. Cl.
*B62D 25/08* (2006.01)
*B60R 19/24* (2006.01)

(56) References Cited

U.S. PATENT DOCUMENTS

2013/0134739 A1  5/2013  Harris et al.
2014/0232137 A1  8/2014  Guyomard et al.

FOREIGN PATENT DOCUMENTS

| DE | 10 2009 010 067 A1 | 10/2009 | | |
|---|---|---|---|---|
| DE | 10 2010 022 738 A1 | 12/2011 | | |
| DE | 10 2013 012 875 A1 | 4/2014 | | |
| EP | 2 374 665 A1 | 10/2011 | | |
| EP | 2 599 689 A2 | 6/2013 | | |
| JP | 2012-206639 A | 10/2012 | | |
| WO | WO 01/42075 A1 | 6/2001 | | |
| WO | WO-03035312 A1 * | 5/2003 | ............ | B23B 51/02 |
| WO | WO 2013/014154 A1 | 1/2013 | | |

OTHER PUBLICATIONS

International Search Report (PCT/ISA/210) issued in PCT Application No. PCT/EP2015/076049 dated Feb. 10, 2016 with English translation (5 pages).
German-language Written Opinion (PCT/ISA/237) issued in PCT Application No. PCT/EP2015/076049 dated Feb. 10, 2016 (5 pages).
English translation of Chinese Office Action issued in counterpart Chinese Application No. 201580061979.6 dated Jul. 20, 2018 (eight pages).

* cited by examiner

FRONT END ASSEMBLY FOR A MOTOR VEHICLE

CROSS REFERENCE TO RELATED APPLICATIONS

This application is a continuation of PCT International Application No. PCT/EP2015/076049, filed Nov. 9, 2015, which claims priority under 35 U.S.C. § 119 from German Patent Application No. 10 2014 224 438.2, filed Nov. 28, 2014, the entire disclosures of which are herein expressly incorporated by reference.

BACKGROUND AND SUMMARY OF THE INVENTION

The invention relates to a front end assembly for a motor vehicle.

A motor vehicle typically has a front end assembly which, in a load-conveying manner, is connected with a supporting body structure of the motor vehicle, which front end assembly has structural components with load paths extending therein. Such a front end assembly conventionally includes a bumper transverse support, which has a pedestrian protection element arranged thereon on the front side, for example, made of absorber foam, a lower transverse support geodetically arranged lower than the bumper transverse support, and an upper component arranged geodetically higher than the bumper transverse support. As a rule, the bumper transverse support is connected on the rearward side by way of deformation elements with engine longitudinal supports of the motor vehicle. The lower transverse support can be connected by way of additional deformation elements with a front-axle support of the motor vehicle. The upper component may be connected by way of lateral vertical connections and a front-side V-shaped strut with the deformation elements, by way of which the bumper transverse support can be connected with the engine longitudinal supports.

Conventionally, the main load path extends sequentially through the pedestrian protection element arranged on the bumper transverse support, through the deformation elements, by means of which the bumper transverse support is connected with the engine longitudinal supports, and through the engine longitudinal supports. A secondary load path extends sequentially through the pedestrian protection element, through the lower transverse support, through the deformation elements by means of which the lower transverse support is connected with the front-axle support, and through the front-axle support or through its longitudinal support.

It is an object of the invention to provide a front end assembly for a motor vehicle, which is improved with respect to its load absorption.

This and other objects are achieved by a front end assembly for a motor vehicle according to the invention comprising at least one bumper transverse support, at least one carrying support that can be arranged vertically on the motor vehicle and on the rearward side with respect to the bumper transverse support, can be fastened on an engine longitudinal support of the motor vehicle, and has at least one upper end section that can be arranged at least partly above the engine longitudinal support. At least one supporting strut extends rearward from the bumper transverse support and downward, by way of which forces acting frontally upon the bumper transverse support can be partially introduced into a front-axle support of the motor vehicle. At least one deformation element can be arranged at least partially geodetically higher than the bumper transverse support and at least partially on the front side in front of the upper end section of the carrying support, and supports itself at least during its deformation at least partially on the upper end section of the carrying support.

According to the invention, an upper secondary load path is formed by the deformation element and the carrying support above a main load path extending through the bumper transverse support. The upper secondary load path can continue in an end face support of the motor vehicle connected with the carrying support. Thus, three load paths can be formed by way of the front end assembly according to the invention. As a result, loads acting frontally upon a front of the motor vehicle can be introduced by way of a larger, particularly almost the entire height of the vehicle front, i.e. by way of a greater load absorption area, into the front end assembly and thereby into a crash management system (CMS) of the motor vehicle comprising the front end assembly. The creation of a third load path or the distribution of a load to three load paths results in a lowering of the forces in individual components of the front end assembly. These components can therefore be produced at lower expenditures with respect to materials, which is accompanied by a weight reduction. A crash management system equipped with the front end assembly according to the invention can thereby be more efficiently utilized than conventional crash management systems. In particular, a crash management system that has a front end assembly according to the invention can absorb different loads by way of the vehicle front. In addition, the ability to react to different crash requirements is increased.

In addition, the invention opens up the possibility of giving components of the motor vehicle, in the environment of the additional upper secondary load path, load-conveying or crash-conveying functions, whereby these components become parts of the crash management system of the motor vehicle. For example, a headlight of the motor vehicle may be used as a crash-conveying element if the additional upper secondary load path extends in proximity of the headlight.

The bumper transverse support may be supported on the rear side by way of deformation elements on engine longitudinal supports of the motor vehicle. For fastening the carrying support on the engine longitudinal support, the carrying support may have a continuous receiving device, the engine longitudinal support extending through this receiving device. The carrying support may be fastened by way of a frictional, form-fitting and/or bonded connection to the engine longitudinal support. The front end assembly preferably includes two corresponding carrying supports of which, with respect to a traveling direction of the motor vehicle, one carrying support can be fastened to a left-side engine longitudinal support and one can be fastened to a right side engine longitudinal support.

The front end assembly may also have two or more supporting struts extending rearward and downward from the bumper transverse support, by way of which the forces acting frontally upon the bumper transverse support can in each case be partly introduced into the front axle support of the motor vehicle. The bumper transverse support is preferably connected by way of at least one supporting strut with a section that is on the left side with respect to the travel direction of the motor vehicle, for example, a left-side longitudinal support, of the front axle support, and by way of at least one additional supporting strut, with a section that is on the right side with respect to the travel direction of the motor vehicle, for example, a right-side longitudinal support, of the front axle support.

The deformation element can permanently support itself, or can partly or completely support itself, only during its deformation on the rear side at the upper end section of the carrying support. The deformation element is preferably constructed such that it absorbs sufficient energy during its plastic deformation. The front end assembly may also have two or more deformation elements which can be arranged partly or completely geodetically higher than the bumper transverse support and at least partly on the front side in front of the upper end section of one carrying support respectively.

According to an advantageous further development, the carrying support has at least one lower end section which can be arranged at least partly below the engine longitudinal support and can be mechanically connected with the supporting strut. This increases the robustness of the front end assembly or reinforces the front end assembly. In this case, it may be provided that the supporting strut is connected by way of the carrying support or directly with the front axle support, particularly with a longitudinal support of the front axle support.

According to a further advantageous development, the supporting strut has at least one connection section, by way of which the supporting strut can be mechanically connected with the front axle support. After that, the supporting strut can be directly connected with the front axle support, particularly with a longitudinal support of the front axle support.

A further advantageous development provides that the deformation element and/or the supporting strut are/is connected by way of at least one vertical connection with the bumper transverse support. The front end assembly can thereby be constructed in a robust and space-saving fashion, particularly because other, particularly conventional, connecting devices will not be necessary.

It is further advantageous for the front end assembly to have at least one upper component that can be arranged geodetically higher than the bumper transverse support and which is connected by way of the vertical connection with the transverse bumper support. As a result, a conventional V-shaped strutting will not be necessary, which is accompanied by an improved installation space utilization and an increased design freedom.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, functionally identical components are provided with the same reference symbols.

Figure 1:
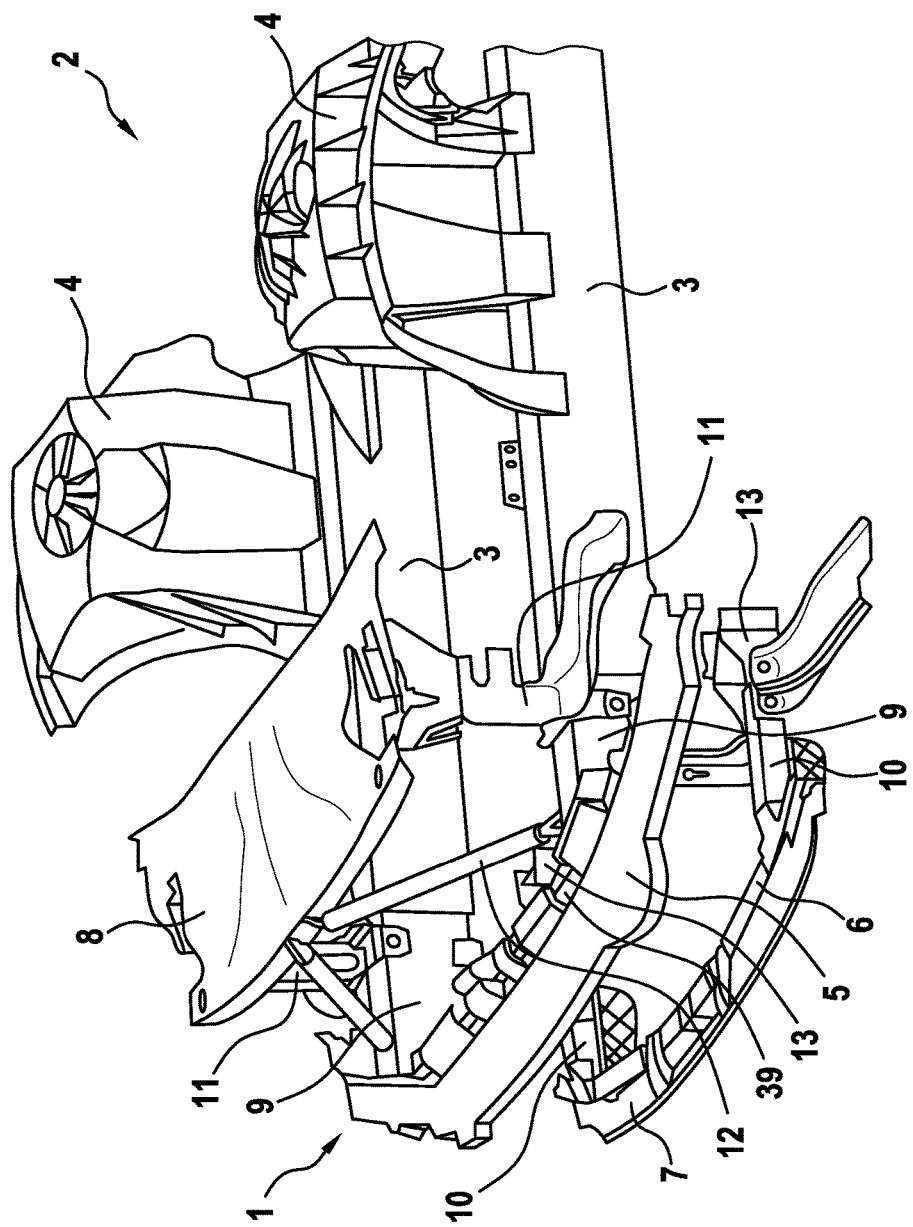
FIG. 1 is a schematic and perspective representation of a conventional front end assembly.

FIG. 1 is a schematic and perspective representation of a conventional front end assembly 1 for a motor vehicle 2, of which only a front end section is visible.

The motor vehicle 2 includes two engine longitudinal supports 3 extending in a mutually parallel and spaced manner, one spring strut dome 4 respectively being arranged on each of the latter.

The front end assembly 1 includes a bumper transverse support 39, at which a pedestrian protection element 5 consisting of an absorber foam is arranged on the front side. Furthermore, the front end assembly 1 includes a lower transverse support 6 which is arranged geodetically lower than the bumper transverse support 39 and has a further pedestrian protection element 7 made of an absorber foam arranged on the front side. The front end assembly 1 further has an upper component 8 arranged geodetically higher than the bumper transverse support 39. The bumper transverse support 39 is connected on the rear side by way of deformation elements 9 with the engine longitudinal supports 3 of the motor vehicle 2. The lower transverse support 6 is connected by way of further deformation elements 10 with a front axle support of the motor vehicle 2, which is not shown. The upper component 8 is connected by way of lateral vertical connections 11 and a front-side V-shaped strut 12 with the deformation elements 9 by way of which the bumper transverse support 39 is connected with the engine longitudinal supports 3. Connection units 13 are arranged at the rear-side ends of the deformation elements 10, by means of which connection units 13 the deformation elements 10 can be connected with the not illustrated longitudinal supports of the front axle support.

Figure 2:
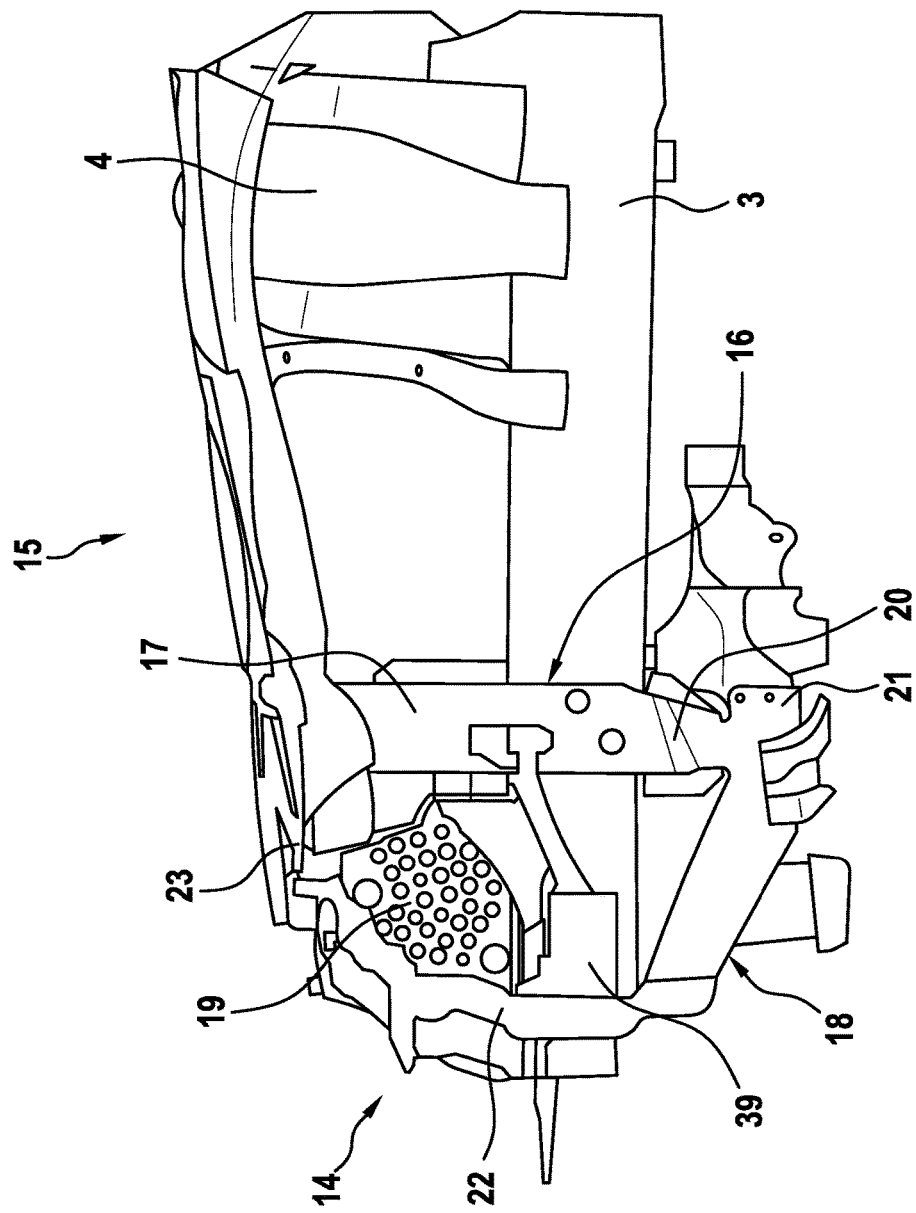
FIG. 2 is a schematic lateral view of an embodiment for a front end assembly according to an embodiment of the invention.

FIG. 2 is a schematic lateral view of an embodiment of a front end assembly 14 according to the invention for a motor vehicle 15, of which only a front end section is visible.

The motor vehicle 15 includes two engine longitudinal supports 3 extending in a mutually parallel and spaced manner, one spring strut dome 4 respectively being arranged on each of the latter. As a result of the lateral view, the engine longitudinal support 3 facing away from the observer is concealed by the engine longitudinal support 3 facing the observer.

The front end assembly 14 includes a bumper transverse support 39, at which a pedestrian protection element consisting of an absorber foam, which is not shown, is arranged on the front side.

Furthermore, the front end assembly 14 includes two carrying supports 16, which can be arranged vertically on the motor vehicle 15 and rearward with respect to the bumper transverse support 39, and can, in each case, be fastened on an engine longitudinal support 3 of the motor vehicle 15. Because of the lateral view, the carrying support 16 facing away from the observer is concealed by the carrying support 16 facing the observer. Each carrying support 16 has an upper end section 17, which is arranged at least partly above the respective engine longitudinal support 3.

The front end assembly 14 also includes two supporting struts 18 extending rearward and downward from the bumper transverse support 39, by way of which supporting struts 18 the forces acting frontally upon the bumper transverse support 39 can in each case be partly introduced into a front axle support, which is not shown, of the motor vehicle 15. Because of the lateral view, the supporting strut 18 facing away from the observer is concealed by the supporting strut 18 facing the observer.

The front end assembly 14 also includes two deformation elements 19 which are arranged geodetically higher than the bumper transverse support 39 and at least partly on the front side in front of the upper end section 17 of one carrying support 16 respectively. These deformation elements 19, at least during their deformation, are supported at least partly at the upper end section 17 of the respective carrying support 16. Because of the lateral view, the deformation element 19 facing away from the observer is concealed by the deformation element 19 facing the observer.

Each carrying support 16 has a lower end section 20, which is at least partly arranged below the respective engine longitudinal support 3, with which end section 20 the respective supporting strut 18 is mechanically connected. Each supporting strut 18 has a connection section 21, by way of which the supporting strut 18 can be mechanically connected with the front axle support.

The front end assembly 14 further includes at least two vertical connections 22. Because of the lateral view, the vertical connection 22 facing away from the observer is concealed by the vertical connection 22 facing the observer. One deformation element 19 and one supporting strut 18 respectively are connected with the bumper transverse support by way of a vertical connection 22. The front end assembly 14 further includes an upper component 23, which is arranged to be geodetically higher than bumper transverse support 39 and which is connected with the bumper transverse support 39 by way of the vertical connections 22.

Figure 3:
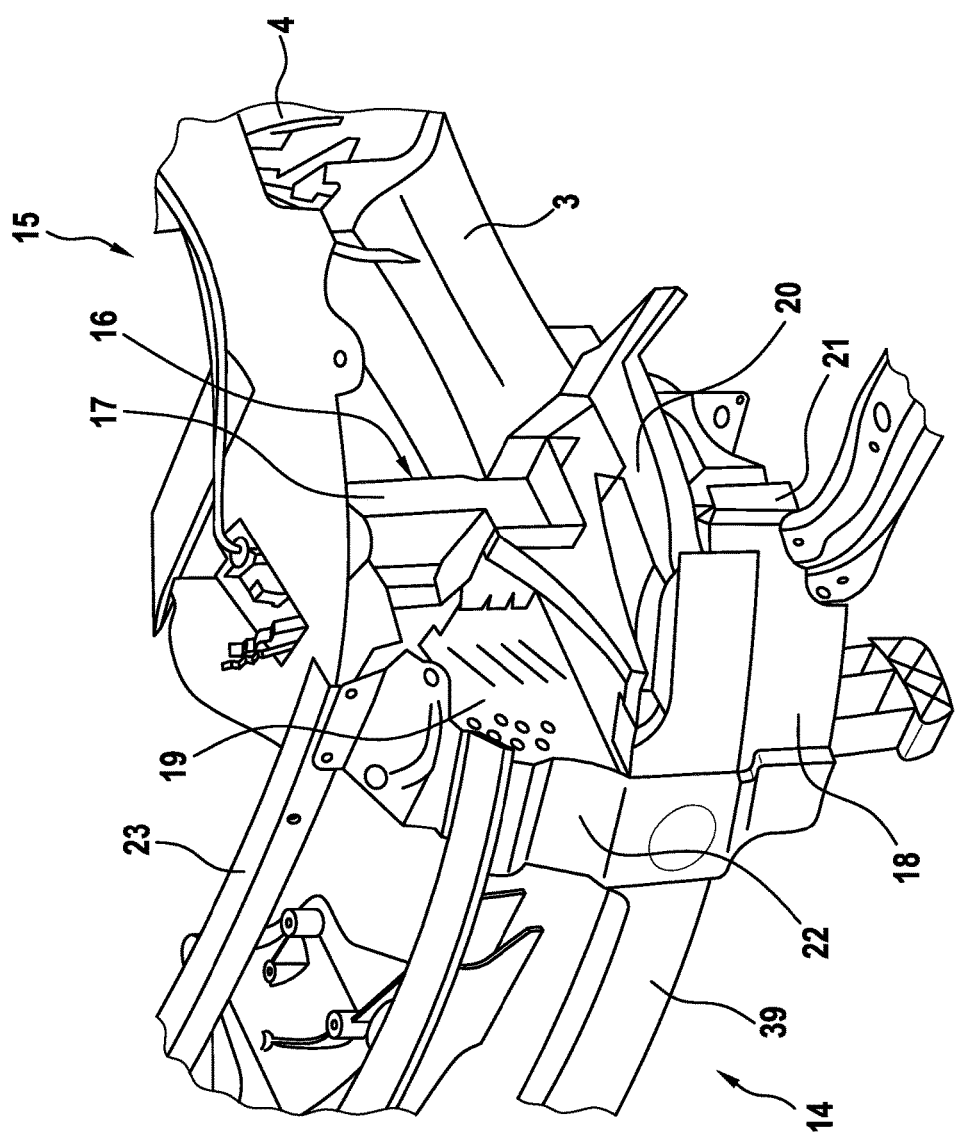
FIG. 3 is a schematic and perspective representation of the front end assembly illustrated in FIG. 2.

FIG. 3 is a schematic perspective representation of the front end assembly 14 shown in FIG. 2. The structure of the deformation element 19 and the construction of the vertical connection 22 are more easily visible.

Figure 4:
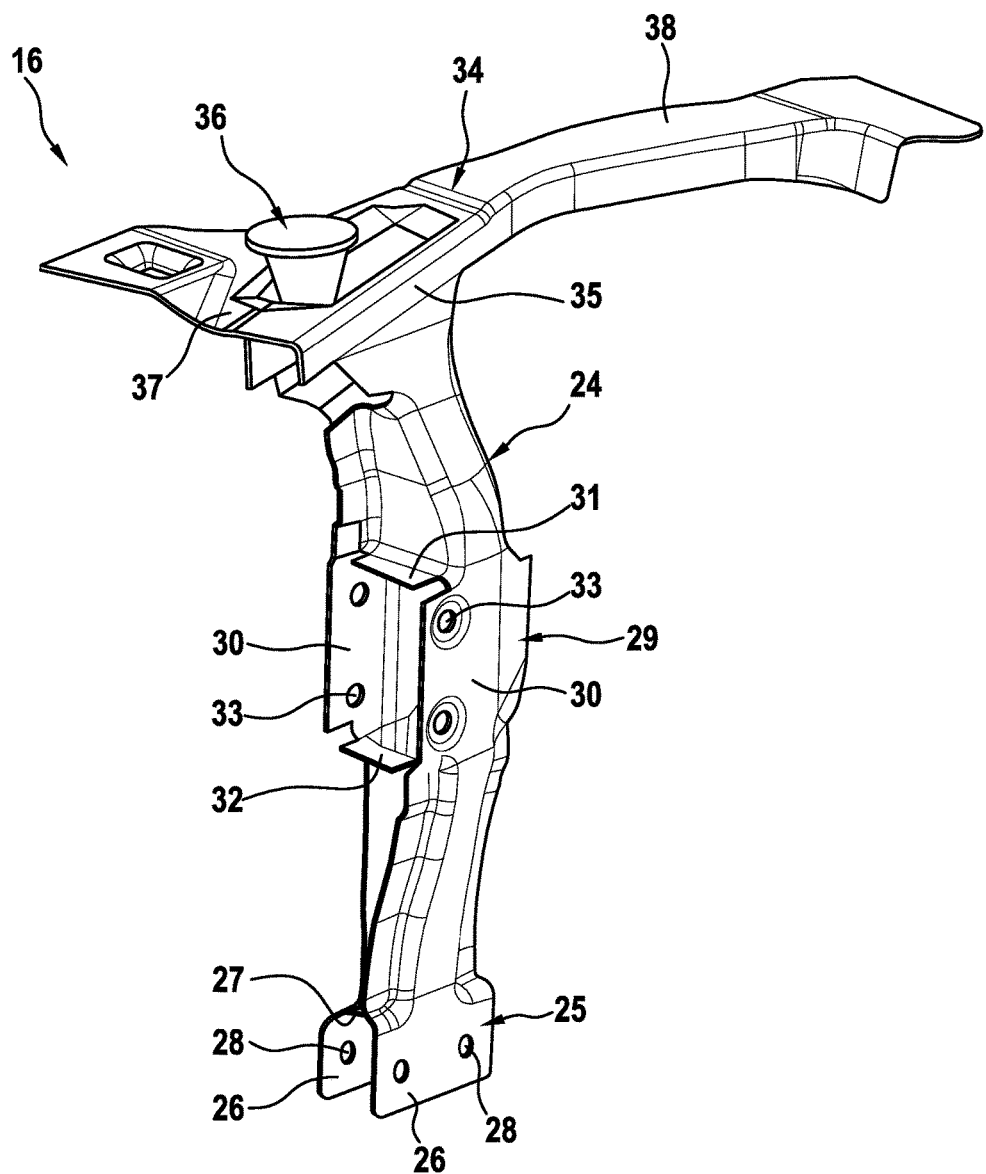
FIG. 4 is a schematic and perspective representation of a further embodiment of a carrying support of a front end assembly according to the invention.

FIG. 4 is a schematic perspective representation of a further embodiment of a carrying support 16 of a not further shown front end assembly according to the invention.

The carrying support 16 includes a supporting section 24 that can be arranged essentially vertically on the motor vehicle.

The supporting section 24 has a lower linking section 25 arranged on the floor side for a linking to a (not shown) longitudinal support of a front axle support of the motor vehicle. The lower linking section 25 is constructed as a fork-shaped receiving device for the at least partial form-locking receiving of the longitudinal support. The lower linking section 25 comprises two legs 26 extending in a mutually parallel and spaced manner, as well as a web 27, which connects the legs 26 with one another. By way of the web 27, the carrying support 16 can support itself on the longitudinal support of the front axle support. Two bores 28 respectively are arranged on the legs 26, by way of which bores 28 the carrying support 16 can be fastened at the longitudinal support of the front axle support via suitable fastening devices.

The supporting section 24 further has a center linking section 29 arranged above the floor-side linking section 25, for the linkage to a not shown engine longitudinal support of the motor vehicle. The center linking section 29 is constructed as a continuous receiving device for the at least partial form-locking receiving of the engine longitudinal support. The center linking section 29 includes two mutually parallel extending and spaced legs 30 and two webs 31 and 32 mutually connecting the legs 30, at which webs 31 and 32 the engine longitudinal support can support itself. In each case, at least two bores 33 are arranged at the legs 30, by way of which bores 33 the carrying support 16 can be fastened to the engine longitudinal support via suitable fastening devices.

The supporting section 24 further has an upper linking section 34 arranged above the center linking section 29, for the linkage to a spring strut dome of the motor vehicle, which is not shown. A receiving section 35 for receiving a front cover lock 36 of the motor vehicle is arranged on the upper linking section 34. Furthermore, a fastening section 37 for the linking to at least one additional component of the front end assembly is arranged on the upper linking section 34. In addition, a lengthening 38 projecting in the direction of the spring strut dome is arranged at the upper linking section 34.

The vertical part of the carrying support 16 arranged above the center receiving section 29 corresponds to the upper end section addressed in FIGS. 2 and 3, at which end section a deformation element, which is not shown, can support itself at least during its deformation. The vertical part of the carrying support 16 arranged below the center receiving section 29 corresponds to the lower end section addressed in FIGS. 2 and 3, which end section can be connected by way of the lower linking section 25 directly with the longitudinal support of the front axle support.

LIST OF REFERENCE NUMBERS

1 Front end assembly
2 Motor vehicle
3 Engine longitudinal support
4 Spring strut dome
5 Pedestrian protection element
6 Transverse support
7 Pedestrian protection element
8 Component
9 Deformation element
10 Deformation element
11 Vertical connection
12 Strutting
13 Connection unit
14 Front end assembly
15 Motor vehicle
16 Carrying support
17 Upper end section
18 Supporting strut
19 Deformation element
20 Lower end section
21 Connection section
22 Vertical connection
23 Upper component
24 Supporting section
25 Lower linking section
26 Leg
27 Web
28 Bore
29 Center linking section
30 Leg
31 Web
32 Web
33 Bore
34 Upper linking section
35 Receiving section
36 Front cover lock
37 Fastening section
38 Lengthening
39 Bumper transverse support The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A front end assembly for a motor vehicle, comprising:
at least one bumper transverse support;
at least one carrying support that: (i) is arrangeable vertically on the motor vehicle and on a rearward side with respect to the bumper transverse support; and (ii) is fastenable on an engine longitudinal support of the motor vehicle, the at least one carrying support having at least one upper end section that is arrangeable at least partly above the engine longitudinal support;
at least one supporting strut extending rearward from the bumper transverse support and downward, by way of which forces acting frontally upon the bumper transverse support are partly introduced into a front-axle support of the motor vehicle; and
at least one deformation element that is arrangeable at least partially geodetically higher than the bumper transverse support and at least partially on a front side in front of the upper end section of the carrying support, and that supports itself at least during deformation of the deformation element at least partially rearward on the upper end section of the carrying support.

2. The front end assembly according to claim 1, wherein the carrying support has at least one lower end section which is arrangeable at least partly below the engine longitudinal support and is mechanically connectable with the supporting strut.

3. The front end assembly according to claim 1, wherein the supporting strut has at least one connection section, by way of which the supporting strut is mechanically connectable with the front axle support.

4. The front end assembly according to claim 2, wherein the supporting strut has at least one connection section, by way of which the supporting strut is mechanically connectable with the front axle support.

5. The front end assembly according to claim 1, wherein one or both of the deformation element and the supporting strut are connected by way of at least one vertical connection with the bumper transverse support.

6. The front end assembly according to claim 2, wherein one or both of the deformation element and the supporting strut are connected by way of at least one vertical connection with the bumper transverse support.

7. The front end assembly according to claim 3, wherein one or both of the deformation element and the supporting strut are connected by way of at least one vertical connection with the bumper transverse support.

8. The front end assembly according to claim 5, further comprising:
at least one upper component which is arrangeable to be geodetically higher than the bumper transverse support, said component being connected with the bumper transverse support by way of the vertical connection.

9. The front end assembly according to claim 6, further comprising:
at least one upper component which is arrangeable to be geodetically higher than the bumper transverse support, said component being connected with the bumper transverse support by way of the vertical connection.

10. The front end assembly according to claim 7, further comprising:
at least one upper component which is arrangeable to be geodetically higher than the bumper transverse support, said component being connected with the bumper transverse support by way of the vertical connection.

* * * * *